US012592779B2

(12) United States Patent
Bell

(10) Patent No.: US 12,592,779 B2
(45) Date of Patent: Mar. 31, 2026

(54) NEAR-OMNIDIRECTIONAL OPTICAL RECEIVER, COMMUNICATION SYSTEM AND PLATFORM

(71) Applicant: The United States of America, as represented by the Secretary of the Navy, San Diego, CA (US)

(72) Inventor: Ryan A. Bell, Mount Pleasant, SC (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 314 days.

(21) Appl. No.: 18/425,946

(22) Filed: Jan. 29, 2024

(65) Prior Publication Data

US 2024/0171285 A1 May 23, 2024

Related U.S. Application Data

(63) Continuation-in-part of application No. 17/706,017, filed on Mar. 28, 2022, now Pat. No. 11,888,580.

(51) Int. Cl.
*H04B 10/60* (2013.01)
*H04B 10/11* (2013.01)
*G02B 3/00* (2006.01)

(52) U.S. Cl.
CPC ............. *H04B 10/60* (2013.01); *H04B 10/11* (2013.01); *G02B 3/0087* (2013.01)

(58) Field of Classification Search
None
See application file for complete search history.

(56) References Cited

U.S. PATENT DOCUMENTS 5,146,230 A 9/1992 Hules
5,680,240 A * 10/1997 Glynn ................ H04B 7/18515
398/115

(Continued)

FOREIGN PATENT DOCUMENTS

CN 209472105 U 10/2019
CN 109687158 B 4/2020

(Continued)

OTHER PUBLICATIONS

John Wallace, "3D-printed gradient-index Lüneburg lens is fabricated at optical wavelengths", Laser Focus World, Dec. 3, 2020.

(Continued)

*Primary Examiner* — Jai M Lee
(74) *Attorney, Agent, or Firm* — Naval Information Warfare; Kyle Eppele; Paul C. Oestreich

(57) ABSTRACT

The present invention includes embodiments of optical receivers, communication systems and communication platforms for receiving electromagnetic radiation (EMR) signals from a plurality of sources and/or directions. An embodiment of an optical receiver, a communication system, or a communication platform may include a Lüneburg lens. The Lüneburg lens allows incoming EMR to be directed to a photodetector. A processor in communication with the photodetector may be configured for calculating power gradient of energy density of the inbound optical signals, isolating discrete inbound optical signals, determining direction of the inbound optical light signals and gathering information transmitted in the inbound optical light signals.

20 Claims, 8 Drawing Sheets

(56) References Cited

U.S. PATENT DOCUMENTS

| | | | |
|---|---|---|---|
| 6,362,795 B2 | 3/2002 | Ishikawa et al. | |
| 6,950,061 B2 | 9/2005 | Howell et al. | |
| 8,515,294 B2 * | 8/2013 | Britz | H04B 10/60 |
| | | | 398/124 |
| 8,854,257 B2 * | 10/2014 | Hamner | G01S 13/4463 |
| | | | 342/149 |
| 10,539,396 B1 | 1/2020 | Plunk et al. | |
| 10,581,525 B2 * | 3/2020 | Velazco | H04B 10/66 |
| 10,770,790 B1 | 9/2020 | Mahanfar | |
| 10,811,768 B2 | 10/2020 | Russell et al. | |
| 10,897,286 B2 | 1/2021 | Liang et al. | |
| 11,264,726 B2 * | 3/2022 | Zimmerman | H01Q 21/061 |
| 11,301,079 B2 * | 4/2022 | Pfeuti | G06F 3/04883 |
| 11,569,583 B2 | 1/2023 | Hormis et al. | |
| 2002/0067314 A1 | 6/2002 | Takimoto et al. | |
| 2014/0347230 A1 * | 11/2014 | Ohmae | G01S 3/30 |
| | | | 343/703 |
| 2021/0306071 A1 * | 9/2021 | Velazco | H04B 10/118 |
| 2023/0168564 A1 * | 6/2023 | Travis | H04N 23/64 |
| | | | 348/14.08 |
| 2025/0309984 A1 * | 10/2025 | Campos | H01Q 3/245 |

FOREIGN PATENT DOCUMENTS

| | | |
|---|---|---|
| CN | 107627611 B | 5/2020 |
| CN | 111830737 A | 10/2020 |
| CN | 111262044 B | 8/2021 |
| JP | 2022543045 A | 10/2022 |
| RU | 2738689 C2 | 12/2020 |

OTHER PUBLICATIONS

Information Disclosure Statement, PTO/SB/08b, U.S. Appl. No. 17/706,017, filed Mar. 28, 2022.
Supplemental Information Disclosure Statement, PTO/SB/08b, U.S. Appl. No. 17/706,017, filed Mar. 28, 2022.
Notice of References Cited, PTO-892, U.S. Appl. No. 17/706,017, filed Mar. 28, 2022.
Palais, "Fiber Optic Communications", Pearson Education, Inc., 5th Edition, pp. 47-49, 2005.
Wikipedia, "Luneburg lens", <web.archive.org/web/20110130003435/ https://en.wickipedia.org/wiki/Lunburg_lens>.
Babayigit et al., "Analytical, numerical, and experimental investigation of a Luneburg lens system for directional cloaking", DOI: 10.1103/PhysRevA.99.043831.
Di Falco et al., "Luneburg lens in silicon photonics", Optical Society of America, Optics Express 5156, vol. 19, No. 6, Mar. 14, 2011.
Lois Yoksoulian, "Researchers confront optics and data-transfer challenges with 3D-printed lens", <https://blogs.illinois.edu/view/6367/1565551394>, Dec. 3, 2020.
Zhao et al., "Three-dimensional Luneburg lens at optical frequencies", Laser Photonics Review, vol. 10, No. 4, pp. 665-672, 2016, DOI 10.1002/lpor.201600051.

* cited by examiner 1 to n number of layers of lenses

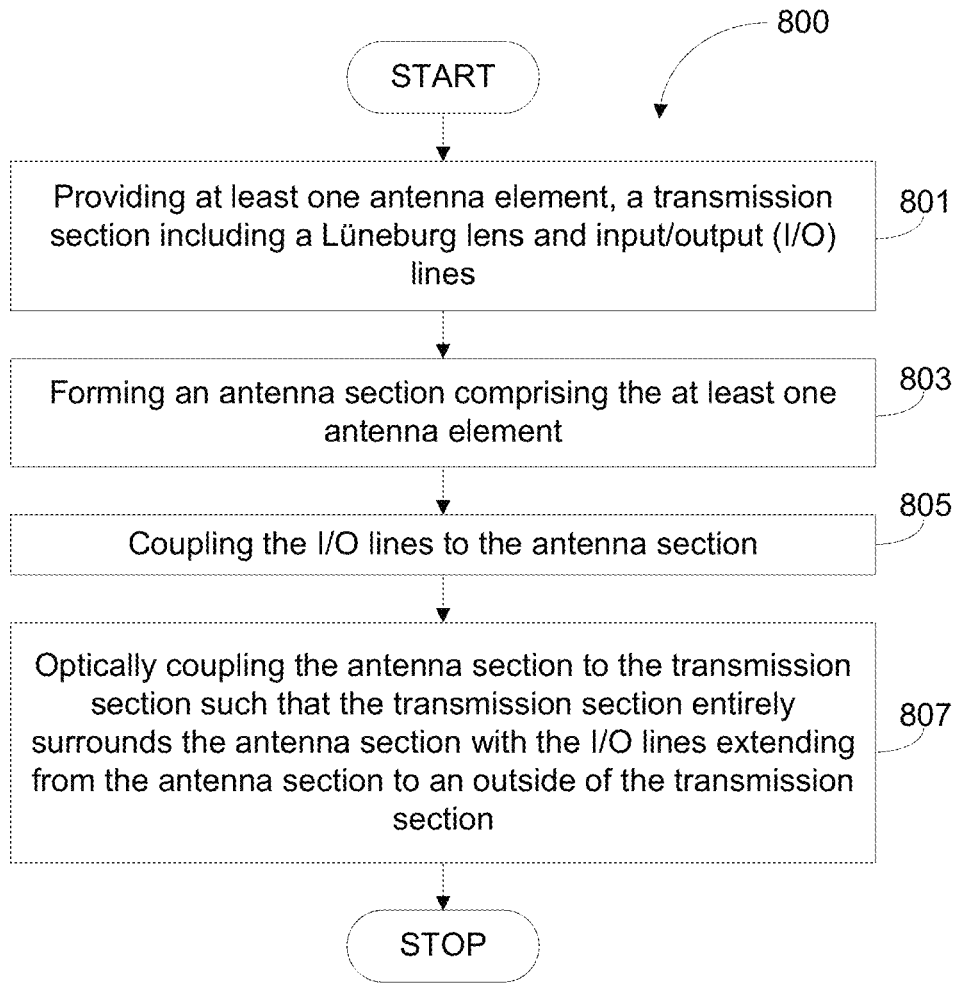

800

START

Providing at least one antenna element, a transmission section including a Lüneburg lens and input/output (I/O) lines          801

Forming an antenna section comprising the at least one antenna element          803

Coupling the I/O lines to the antenna section          805

Optically coupling the antenna section to the transmission section such that the transmission section entirely surrounds the antenna section with the I/O lines extending from the antenna section to an outside of the transmission section          807

STOP

*FIG. 8*

NEAR-OMNIDIRECTIONAL OPTICAL RECEIVER, COMMUNICATION SYSTEM AND PLATFORM

CROSS-REFERENCE TO RELATED APPLICATIONS

This US Continuation-in-Part Patent Application claims benefit and priority to U.S. Nonprovisional patent application Ser. No. 17/706,017, filed Mar. 28, 2022, titled: "NEAR-OMNIDIRECTIONAL OPTICAL COMMUNI-CATION SYSTEM", Navy Case Number 114402, issued Jan. 30, 2024, as U.S. Pat. No. 11,888,580 B2, the contents of which is hereby incorporated by reference for all purposes as if fully set forth herein.

FEDERALLY-SPONSORED RESEARCH AND DEVELOPMENT

The United States Government has ownership rights in this invention. Licensing and technical inquiries may be directed to the Office of Research and Technical Applica-tions, Naval Information Warfare Center Atlantic, Code 70F00, North Charleston, SC, 29419-9022; voice (843) 218-3495; email ssc_lant_T2@navy.mil. Reference Navy Case 211847.

BACKGROUND OF THE INVENTION

Field of the Invention

The present invention relates generally to optical com-munications systems. More particularly, the present inven-tion relates to near-omnidirectional optical communications systems.

Description of Related Art

Optical communication methods between non-static point-to-point locations typically use a series of mirrors, stabilizers, and control systems to effectively allow the devices to be aimed at one another to complete the com-munication link. The primary challenges associated with this method of communication require high fidelity control sys-tems and an inherent inability to receive multiple signals because otherwise the original intended communication link would have to be broken.

In view of the foregoing and for other reasons that will become clearer, there exists a need in the art for improved near-omnidirectional optical communication systems.

SUMMARY OF THE INVENTION

An embodiment of an optical communication receiver is disclosed. The embodiment of an optical communication receiver may include a photodetector having a sensor plane, the photodetector configured to receive incident optical light signals and detect optical signal energy density correspond-ing to x-y locations along the sensor plane. The embodiment of an optical communication receiver may further include a Lüneburg lens adjacent to the photodetector and configured to direct incident optical light signals onto the sensor plane of the photodetector. The embodiment of an optical com-munication receiver may further include a processor in communication with the photodetector configured for cal-culating power gradient of the optical signal energy density, isolating discrete signals, determining direction of the incident optical light signals and gathering information trans-mitted in the incident optical light signals.

An embodiment of an optical communication system is disclosed. The embodiment of an optical communication system may include an optical receiver configured to receive inbound optical signals, the optical receiver comprising a Lüneburg lens. The embodiment of an optical communica-tion system may further include a processor in communica-tion with the optical receiver and configured for calculating power gradient of energy density of the inbound optical signals, isolating discrete inbound optical signals, determin-ing direction of the inbound optical light signals and gath-ering information transmitted in the inbound optical light signals.

An embodiment of a communication platform is dis-closed. The embodiment of a communication platform may include at least one optical communication system, includ-ing an optical receiver configured to receive inbound optical signals, the optical receiver comprising a Lüneburg lens and a processor in communication with the optical receiver and configured for calculating power gradient of energy density of the inbound optical signals, isolating discrete inbound optical signals, determining direction of the inbound optical light signals and gathering information transmitted in the inbound optical light signals.

Additional features and advantages of the present inven-tion will become apparent to those skilled in the art upon consideration of the following detailed description of the illustrative embodiment exemplifying the best mode of carrying out the invention as presently perceived.

BRIEF DESCRIPTION OF THE DRAWINGS

The following drawings illustrate exemplary embodi-ments for carrying out the invention. Like reference numer-als refer to like parts in different views or embodiments of the present invention in the drawings.

FIG. 8 is a flowchart of an embodiment of an exemplary method for manufacturing communication systems, accord-ing to the present invention.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment but may be expanded for use with any of the other methods and systems described herein as will be understood by one of ordinary skill in the art unless specifically otherwise stated. It will be further understood that the embodiments of the invention described herein are not intended to be exhaustive or to limit the invention to precise forms disclosed. Rather, the embodiments selected for description have been chosen to enable one skilled in the art to practice the invention.

Figures 1, 2:
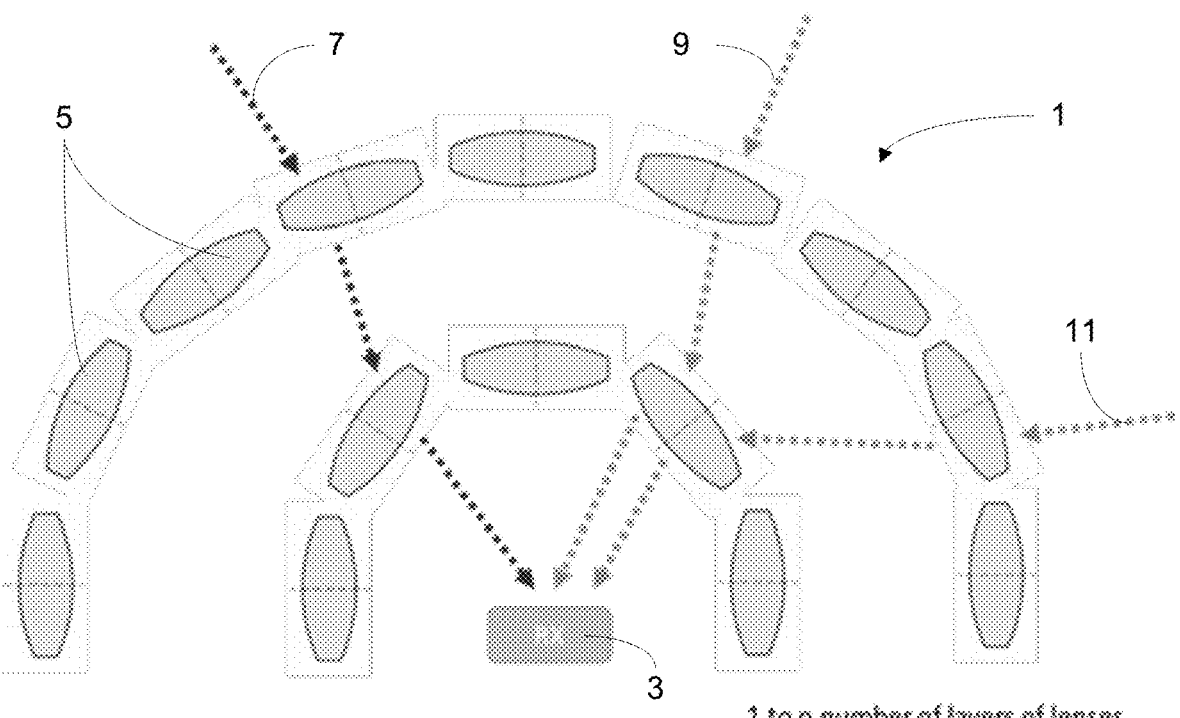
FIG. 1 is a two-dimensional (2D) diagram illustrating an exemplary transmission section surrounding an antenna, according to the present invention.
FIG. 2 is diagram illustrating a spherical transmission surrounding an antenna, according to the present invention.

FIG. 1 shows a cross-sectional view an exemplary communication system, shown generally at arrow 1, with a transmission section 5 surrounding an antenna section 3. Exemplary transmission sections 5 can be made with a variety of transmission elements operating in tandem (e.g., a plurality of lens or mirror elements arranged in a plurality of rows or rings) or a continuous refraction medium shaped to refract EMR in a toward a predetermined area or point within the transmission section 5 (e.g., a Lüneburg lens). Transmission section 5 may completely surround the antenna section so that it can refract a plurality of optical paths 7, 9 and 11 such that regardless of the incoming direction of each optical path, the optical path 7, 9, and 11 always ends at antenna section 3. The thickness of transmission section 5 can be scaled based on the size of antenna section 3. The size of antenna section 3 may be dependent on the properties of the chosen antenna section 3 (e.g., particular antenna elements may have a minimum size), so the thickness of transmission section 5 can be increased or decreased to reach a predetermined lens to antenna ratio. A wide variety of ratios can be used if the transmission section is thick enough to refract all incoming EMR to reach antenna section 3. In exemplary embodiments, the transmission section 5 can be made with a gradient refractive index such that the index decreases radially from the center-most portion to the outer-most portion of the transmission section 5. In these embodiments, the gradient refractive index facilitates bending incoming EMR towards the antenna section 3 and prevents backscattering of EMR at the outer surface of the transmission section 5.

FIG. 2 illustrates a cross-sectional view of an exemplary communication system 1 with a spherical transmission section 5 surrounding an antenna section 3. Input/output (I/O) lines 21 allow antenna section 3 to transmit information and data to other systems (not shown). In exemplary embodiments, transmission section 5 can be manufactured around antenna section 3 such that antenna section 3 is embedded within transmission section 5. In other exemplary embodiments, antenna section 3 can be embedded within transmission section 5 after the transmission section is partially constructed, then transmission section 5 can be completed. In other exemplary embodiments, antenna section 3 can be embedded within transmission section 5 after the transmission section is fully constructed.

Figures 3A, 3B, 3C:
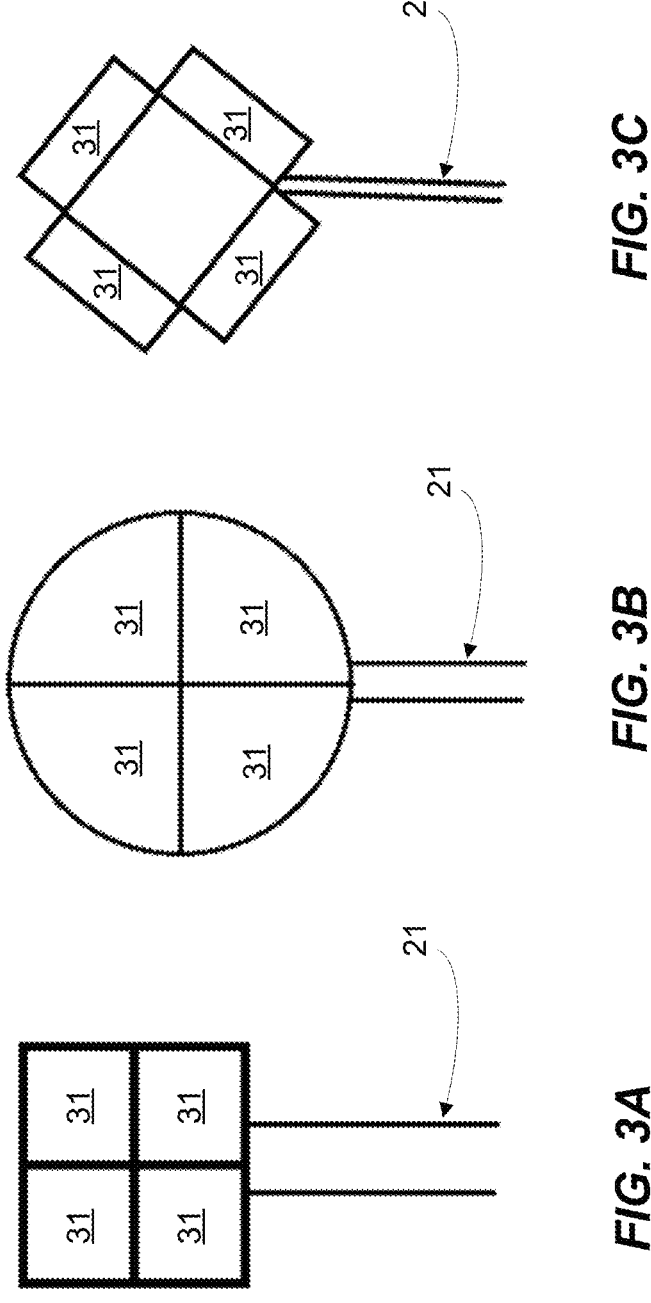
FIGS. 3A to 3C illustrate a plurality of alternative antenna section embodiments, according to the present invention.

FIG. 3A to 3C illustrate cross-sectional views of alternative embodiments of exemplary antenna sections 3. In exemplary embodiments, antenna section 3 can be made with a plurality of antenna elements 31. By using multiple antenna elements 31, a user can determine the direction of incoming EMR based on which antenna elements received EMR. Antenna elements 31 can each be constructed with differing shapes to optimize receiving capability at the cost of manufacturing complexity. For example, FIG. 3A illustrates using rectangular antenna elements 31, which may be the simplest to design and manufacture. FIG. 3B illustrates a spherical antenna section 3 which may be the most efficient and accurate of the antenna sections 3. However, because of the difficulty of designing and manufacturing a spherical antenna section 3 (FIG. 3B), a user may prefer to approximate a cube or sphere with rectangular antenna elements 31, see, e.g., FIG. 3C.

For situations where directional detection is important, exemplary embodiments can use larger numbers of antenna elements to increase the accuracy of directional detection. For example, one can decrease the size of individual rectangular antenna elements and increase the number of total number of elements used such that the overall size of the antenna section stays constant while also increasing the measurement fidelity. For situations where directional detection is needed from specific directions, exemplary embodiments can be shaped with antenna elements to match the expected environment. For example, a hemispherical antenna section 3 can be used for surface-based systems because transmissions will only be received along or above the surface. For elevated operating environments (e.g., system mounted on a raised structure or aerial systems), a fully spherical antenna section 3 allows transmissions to be received from any direction. In these elevated operating environment embodiments, the layers of the transmission section can match the general shape such that the transmission section 5 only covers the expected angles of signal detection. For example, a hemispherical antenna section does not need refractive material below the spherical cap, so condensing the transmission section to a hemispherical shape can simply production and reduce material costs.

Figure 4:
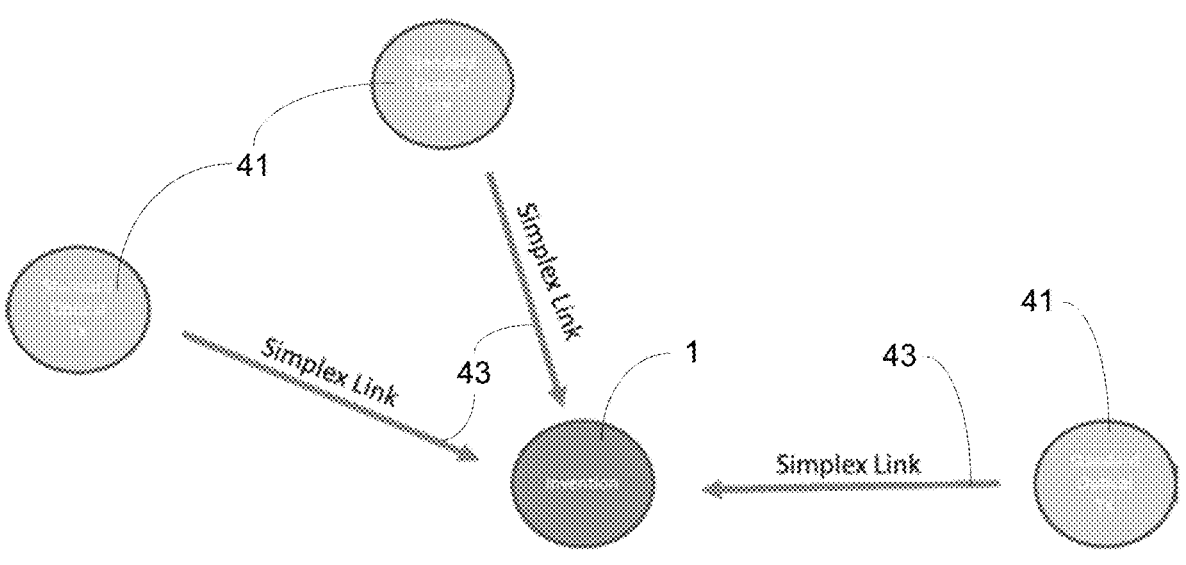
FIG. 4 is a diagram of an exemplary system used in a simplex configuration, according to the present invention.

FIG. 4 illustrates an exemplary communication system 1 used in a simplex configuration with a plurality of transmitters 41 (three shown). In this configuration, system 1 receives signals from transmitters 41 through corresponding simplex connections 43. Communication system 1 may be configured to receive transmissions from a plurality of angles (e.g., as shown in FIG. 1) so that the position of transmitters 41 with respect to communication system 1 can vary.

Figure 5:
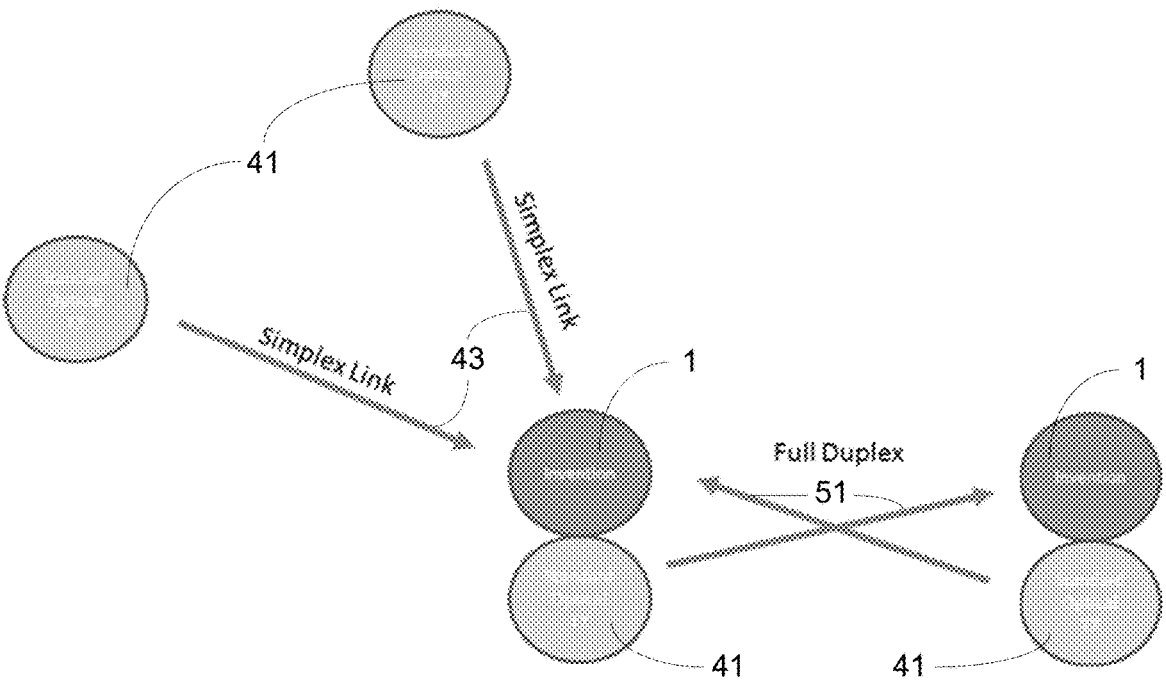
FIGS. 5 and 6 are block diagrams illustrating combined simplex and duplex configuration system embodiments, according to the present invention.

FIG. 5 shows another exemplary communication system 1 with a combined simplex and duplex configuration with a plurality of transmitters 41. In this configuration, communication system 1 can receive signals from transmitters 41 through corresponding simplex connections 43. Communication system 1 may further be configured to receive transmissions from a plurality of angles (e.g., as shown in FIG. 1) so that the position of transmitters 41 with respect to communication system 1 can vary. In addition, each embodiment of communication system 1 can be paired with a transmitter 41 to enable full duplex connections 51 between multiple communication systems 1 (two shown in FIG. 5) to allow communication systems 1 to operate in conjunction with each other.

Figure 6:
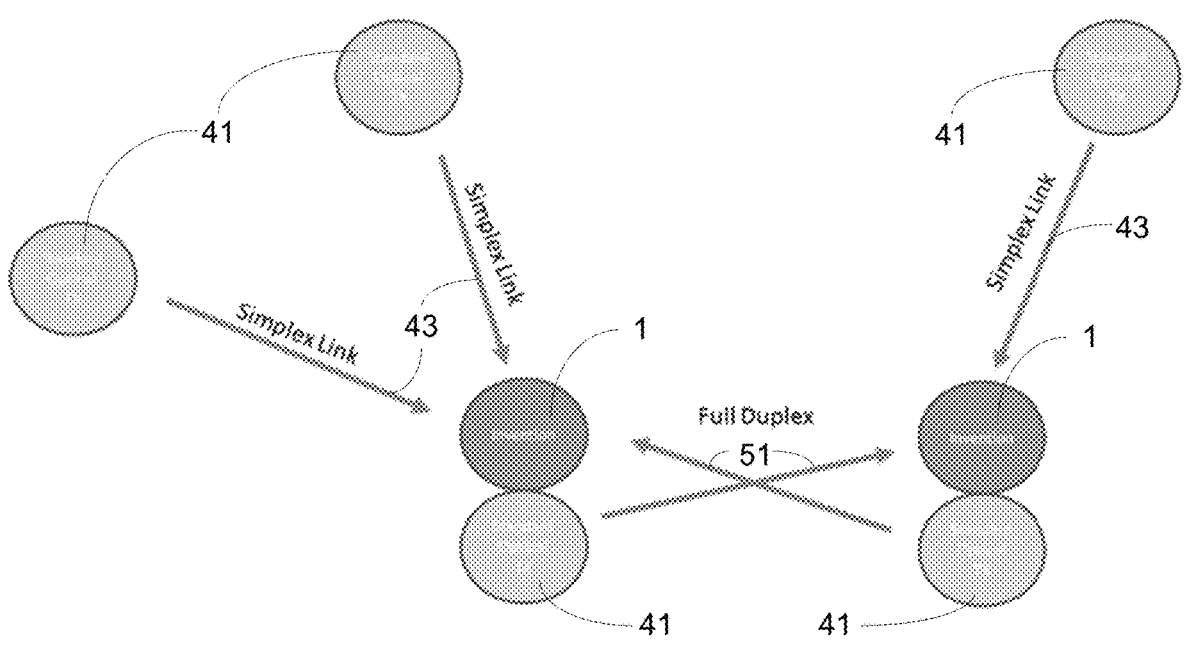

FIG. 6 illustrates yet another exemplary system 1 with a combined simplex 43 and duplex 51 configuration employing a plurality of transmitters 41. In this configuration, communication system 1 can receive signals from transmitters 41 through corresponding simplex connections 43. Communication system 1 may further be configured to receive transmissions from a plurality of angles (e.g., as shown in FIG. 1) so that the position of transmitters 41 with respect to system 1 can vary. In addition, each communication system 1 can be paired with a transmitter 41 to enable duplex connections 51 between multiple communication systems 1 to allow communication systems 1 to operate in conjunction with each other. Each communication system 1 can independently receive transmissions from transmitters 41 so that in combination the communication systems 1 can provide a larger target/reception area.

Figure 7:
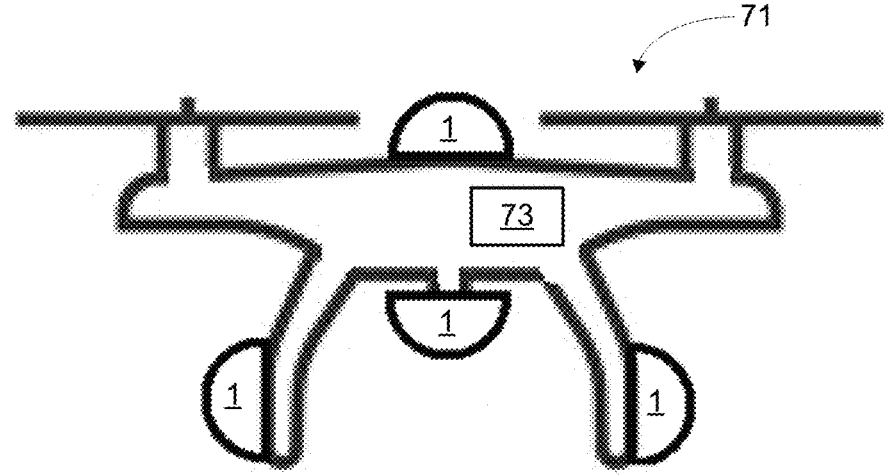
FIG. 7 is a diagram illustrating a plurality of exemplary systems installed on mobile platform, according to the present invention.

FIG. 7 illustrates a plurality of exemplary communication systems 1 installed on platform 71. As shown in FIG. 7 platform 71 may include an electronics section 73 in communication with a plurality of exemplary communication systems 1 (four shown). In exemplary embodiments, a plurality of communication systems 1 can be used in tandem allowing more precise communication and detection. Each communication system 1 can be configured to receive from a different field of view. In these embodiments, each communication system 1 can comprise non-spherical (i.e., hemispherical) antenna elements 31 because no single communication system 1 needs to detect signals from every direction. In exemplary embodiments, the plurality of communication systems 1 can be configured to receive signals from overlapping fields of view to ensure there are no blind spots or to provide redundant detection for improved accuracy. For example, the platform 71 can have vertically oriented systems 1 to provide detection around the entirely of platform 71 and can also have horizontally oriented systems 1 to provide redundant detection capabilities.

Electronics section 73 may include a variety of standard electronics (e.g., a processor, power source, etc., not shown for ease of illustration) in communication with at least one transmitter 41 (also not shown) to allow the communication systems 1 to operate with external systems outside of the platform 71 (e.g., additional platforms, ground stations, etc.) via duplex links 51 (not shown in FIG. 7). Electronics section 73 can be electrically coupled to each communication system 1 by I/O lines (not shown for simplicity of illustration) to process signals and allow the communication systems 1 to communicate with each other. For mobile platforms (e.g., aerial vehicles, drones, etc.), signals detected and processed can trigger platform 71 responses (e.g., maneuvering or orienting the platform, landing procedures, etc.)

FIG. 8 illustrates a flowchart of an exemplary method 800 for manufacturing communication systems, according to the present invention. Method 800 may include providing 801 at least one antenna element 31, at least one transmission medium, and input/output (I/O) lines 21. In exemplary embodiments of method 800, each of the at least one transmission medium can be a mirror, a lens, or a refraction medium. Method 800 may further include forming 803 an antenna section 3 comprising the at least one antenna element 31. In exemplary embodiments, the at least one antenna element 31 can be oriented to face a particular direction. In exemplary embodiments, the at least one antenna element 31 can be made to have a variety of shapes (e.g., cuboids, spherical segments, spherical wedges, etc.) In exemplary embodiments having a plurality of antenna elements 31, the antenna elements 31 can be arranged to form a particular shape when combined (e.g., cuboids forming a cube around an empty interior, or spherical wedges forming a sphere). Method 800 may further include optically coupling 805 the I/O lines 21 to the antenna section 3. Each of the at least one antenna elements 31 can be configured to transmit signal info through the I/O lines 21. Method 800 may further include coupling 807 the antenna section 3 to the transmission medium such that the transmission medium forms a transmission section 5 around the antenna section 3. In exemplary embodiments, the transmission section 5 can be formed before any transmission medium is coupled to the antenna section 3. In alternative exemplary embodiments, each transmission medium can be directly coupled to the antenna section 3 such that the transmission section 5 is built around the antenna section 3. In at least some of the embodiments, the transmission medium can be additively manufactured around the antenna section 3.

Figures 9A, 9B:
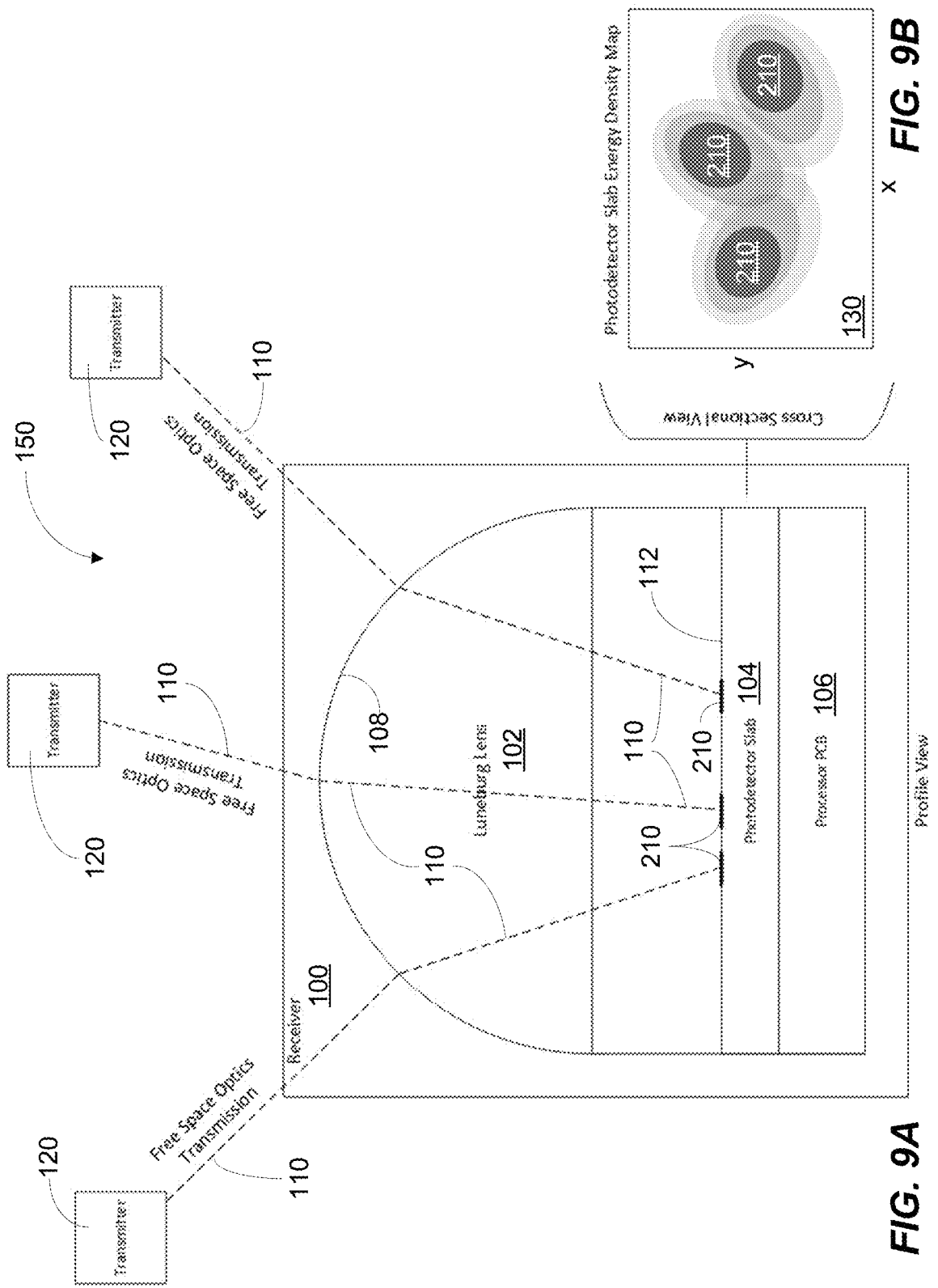
FIG. 9A is a cross-sectional (profile) view of an embodi-ment of an optical communication receiver, according to the present invention.
FIG. 9B is an exemplary plan view of exemplary incident light density from exemplary transmitters shown in FIG. 9A after passing through a Lüneburg lens and onto a photode-tector, according to the present invention.

FIG. 9A is a cross-sectional (profile) view of an embodiment of an optical communication receiver 100, according to the present invention. The embodiment of an optical communication receiver 100 may include a Lüneburg lens 102 configured to bend external free-space optical transmissions 110 from external transmitters 120 toward a photodetector 104 in communication with a processor 106. As depicted in FIG. 9A, the Lüneburg lens 102 may be spherical or hemispherical 108 in shape and thus capable of receiving and bending optical frequency light transmissions 110 impinging on its hemispherical surface 108 toward the sensor plane 112 of photodetector 104. While not shown to scale, the incoming signal energy density 210 is depicted by bold lines in FIG. 9A.

Operationally, the optical communication receiver 100 may be included in an optical receiver system, shown generally at arrow 150, including multiple externally located optical transmitters 120 (three shown in FIG. 9A) located at various sites near or distant from the optical communication receiver 100 with various angles relative to the optical communication receiver 100. Each optical transmitter 120 may be configured to transmit signals at free space optic (FSO) visible light frequencies for reception at receiver 100. The Lüneburg lens 102 bends the optical signals 110 towards a sensor plane 112 which forms an interface between the Lüneburg lens 102 and the photodetector 104.

The Lüneburg lens 102 may be configured to bend the light from the optical transmissions 110 to hit a photodetector 104 behind the Lüneburg lens 102. The Lüneburg lens 102 may be configured for operation in the visible spectrum according to a presently preferred embodiment. The Lüneburg lens 102 may be additively manufactured or formed using conventional techniques. It will be understood that the particulars of constructing a Lüneburg lens 102 for use with visible spectrum light suitable for use in the present invention falls within the knowledge of one of ordinary skill in the art. See e.g., Yokoulian, "Researchers confront optics and data-transfer challenges with 3D-printed lens", News Bureau, University of Illinois Urbana-Champaign, Dec. 3, 2020, <https://blogs.illinois.edu/view/6367/1565551394>; Wallace, "3D-printed gradient-index Lüneburg lens is fabricated at optical wavelengths", Laser Focus World, Dec. 3, 2020, <https://www.laserfocusworld.com/optics/article/14188413/3d-printed-gradient-index-luneburg-lens-is-fabricated-at-optical-wavelengths>; Babayrğit et al., "Analytical, numerical, and experimental investigation of a Luneburg lens system for directional cloaking", Phys. Rev. A 99, 043831—Published 23 Apr. 2019; Zhao et al., "Three-dimensional Luneburg lens at optical frequencies", Wiley Online Library, Laser & Photonics Reviews, <https://doi.org/10.1002/Ipor.201600051>; and Di Falco et al., "Luneburg lens in silicon photonics", Optica Publishing Group, Optics Express Vol. 19, Issue 6, pp. 5156-5162

(2011), <https://doi.org/10.1364/0E.19.005156>. The contents of each of the five above-referenced technical articles are hereby incorporated by reference for all purposes as if fully set forth herein.

FIG. 9B is an exemplary plan view of exemplary incident light density from the transmitters 120 shown in FIG. 9A after passing through a Lüneburg lens 102 and onto the photodetector 104, according to the present invention. The incident light stimulates the photodetector 104 with its variable energy density (darker being higher density). This energy density detected by the photodetector 104 may then be digitized and processed in the processor 106. More particularly, FIG. 9B illustrates a rectangular sensor region 130 or map with x and y coordinates corresponding to incident light energy at each pixel. Still more particularly, three incoming signal densities 210 are shown in FIG. 9B, though not necessarily to scale. It will be understood that the processor 106 may be any suitable digital signal processor, or microprocessor, whether custom designed, commercially available, or programmable, e.g., field programmable gate array (FPGA), application specific integrated circuit (ASIC), or as a component with other electronics on a printed circuit board (PCB), a computer system or other higher-order computational system. It will further be understood that the processor may be implemented along with any suitable software providing computer instructions for control of the signal processing for inbound or outbound optical signals consistent with the teachings of the present invention and that such hardware and software implementations fall within the knowledge of one of ordinary skill in the art and thus will not be further elaborated herein.

Figures 10, 11:
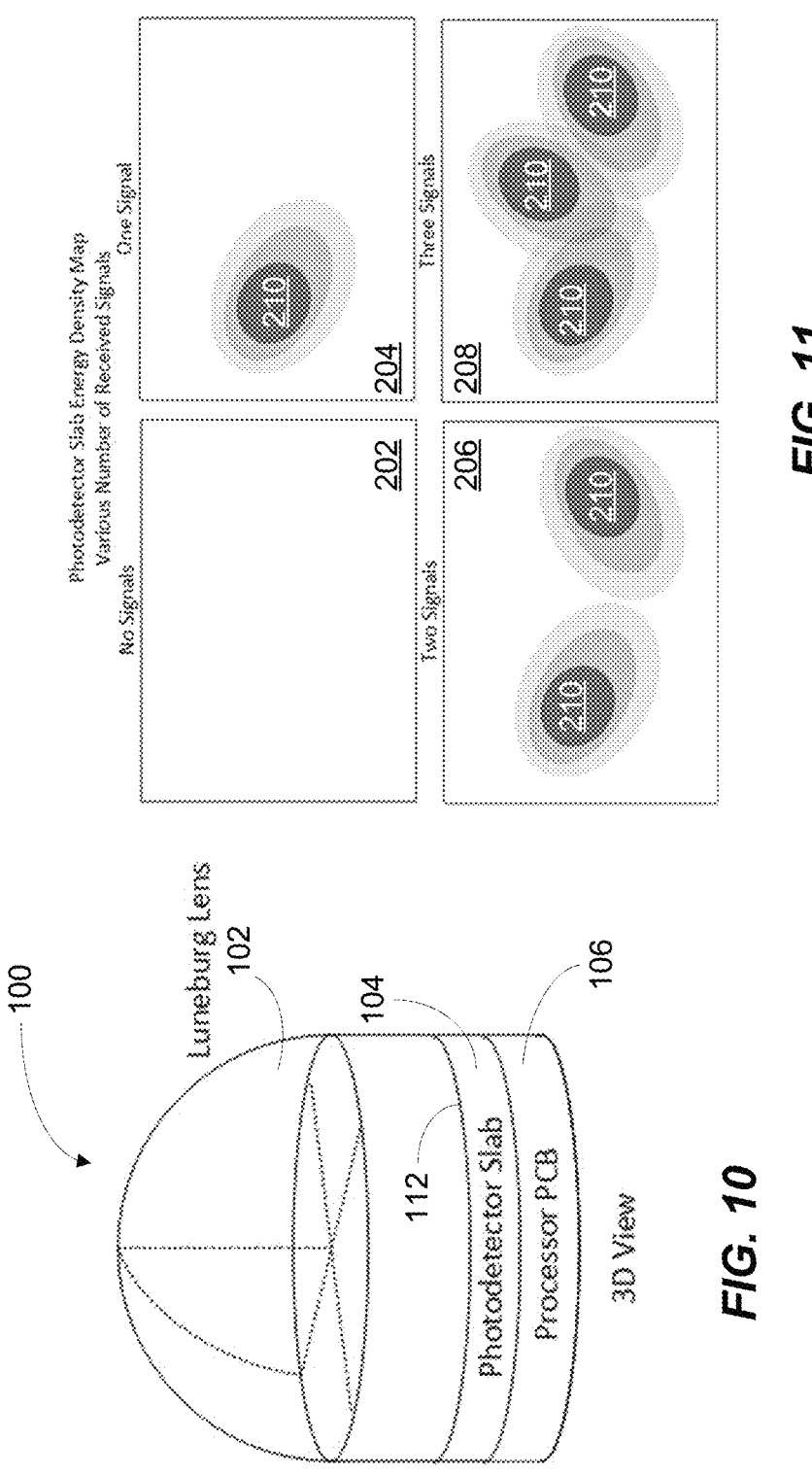
FIG. 10 is a three-dimensional (3D) depiction of an exemplary optical communication receiver, according to the present invention.
FIG. 11 illustrates exemplary energy density maps depicting incident light signals ranging from none to three with overlap, according to the present invention.

FIG. 10 is a three-dimensional (3D) depiction of an exemplary optical communication receiver 100, according to the present invention. As depicted in FIG. 10, optical communication receiver 100 may include a Lüneburg lens 102 stacked on top of a photodetector 104, which in turn may be stacked on top of, and in communication with, processor 106. Operationally, the Lüneburg lens 102 is configured to direct incident light onto photodetector 104 with the processor 106 for signal processing.

FIG. 11 illustrates exemplary energy density maps 202, 204, 206 and 208 depicting incident light signals ranging from none to three with overlap, according to the present invention. More particularly, map 202 in the upper left-hand corner of FIG. 11 illustrates no signals. Map 204 in the upper right-hand corner of FIG. 11 illustrates one exemplary signal 210. Map 206 in the lower left-hand corner of FIG. 11 illustrates two exemplary signals 210. Finally, map 208 in the lower right-hand corner of FIG. 11 illustrates three exemplary signals 210. Again, each energy density map 202, 204, 206 and 208 may also be representative of the photodetector 104 sensor surface in an x-y plane. It will be understood that the darker the signal 210, the higher the energy density in that location. The gradient of concentration of energy allows for delineation between multiple signals 210 present at the same time.

Figure 12:
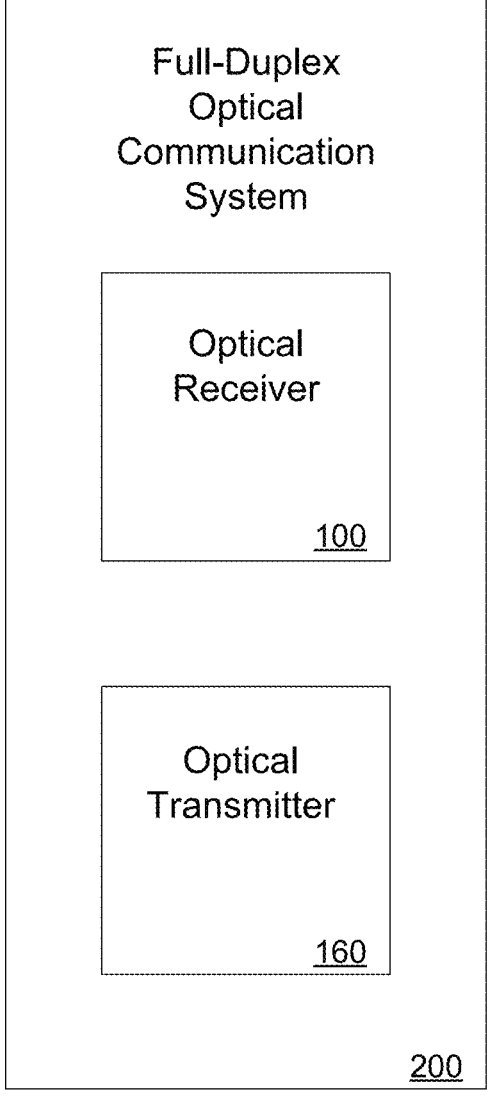
FIG. 12 is a block diagram of an exemplary full-duplex optical transceiver, according to the present invention.

FIG. 12 is a block diagram of an exemplary full-duplex optical communication system 200, according to the present invention. The illustrated embodiment of a full-duplex optical communication system 200 may include an optical communication receiver 100 as described herein in communication with any suitable optical transmitter 160. It will be understood that communication system 200 may be used in the full-duplex 51 optical communications systems illustrated in FIGS. 5 and 6 by simply replacing the paired communication system 1 and transmitter 41. It will be further understood that optical communication receiver 100 may be used in place of communication system 1 in FIGS. 4, 5 and 6, according to further embodiments of the present invention. It will also be understood that the particular communication platform upon which the inventive optical communication receiver 100 or communications system 200 is integrated is not limiting. Any suitable platform, whether stationary (e.g., building, tower, ground, etc.), aerial (e.g., drone, aircraft, etc.), or mobile surface-based (e.g., ground vehicle, watercraft, etc.) may be used to support the inventive optical communication receiver 100 or communications system 200 disclosed herein. Such platforms are well-known to those of ordinary skill in the art and thus will not be further detailed herein.

Having described particular embodiments of the communications receiver 100, communications systems 1 and 200 and method 800 for manufacturing communication systems with reference to the drawings, more general embodiments of the present invention are described follows. An embodiment of an optical communication receiver is disclosed. The embodiment of an optical communication receiver may include a photodetector having a sensor plane. According to this embodiment, the photodetector may be configured to receive incident optical light signals and detect optical signal energy density corresponding to x-y locations along the sensor plane. The embodiment of an optical communication receiver may further include a Lüneburg lens adjacent to the photodetector, the Lüneburg lens configured to direct incident optical light signals onto the sensor plane of the photodetector. The embodiment of an optical communication receiver may further include a processor in communication with the photodetector configured for calculating power gradient of the optical signal energy density, isolating discrete signals, determining direction of the incident optical light signals and gathering information transmitted in the incident optical light signals.

According to another embodiment of the optical communications receiver, the Lüneburg lens may include an external surface shape that is spherical or hemispherical. According to yet another embodiment of the optical communications receiver, the Lüneburg lens may be tuned for visible spectrum light transmission. According to still another embodiment of the optical communications receiver, the Lüneburg lens may be formed of a continuous refractive medium. According to a particular embodiment, the refractive medium may include a gradient index lens having a refractive index that decreases radially from a center-most surface to the outer-most surface of the Lüneburg lens. According to another embodiment, the optical communication system, may further include an optical transmitter in communication with the processor, the optical transmitter configured to transmit outbound optical signals under processor control.

An embodiment of an optical communication system is disclosed. The embodiment of an optical communication system may include an optical receiver configured to receive inbound optical signals, the optical receiver comprising a Lüneburg lens. The embodiment of an optical communication system may further include a processor in communication with the optical receiver. The processor may further be configured for calculating power gradient of energy density of the inbound optical signals. The processor may further be configured for isolating discrete inbound optical signals, which may be overlapped. The processor may further be configured for determining the direction of the inbound optical light signals. The processor may further be configured for gathering information transmitted in the inbound optical light signals, i.e., decoding.

According to one embodiment of an optical communication system, the optical receiver may further include a photodetector having a sensor plane. According to this embodiment, the photodetector may be disposed adjacent to the Lüneburg lens and configured to receive the inbound optical light signals transmitted through the Lüneburg lens. According to this embodiment, the photodetector may further be configured to detect optical signal energy density corresponding to x-y locations along the sensor plane. According to yet another embodiment of an optical communication system, the Lüneburg lens may be tuned for visible spectrum light transmission. According to still yet another embodiment of an optical communication system, the Lüneburg lens may be formed of a continuous refractive medium. According to one particular embodiment of an optical communication system, the refractive medium may include a gradient index lens having a refractive index that decreases radially from a center-most surface to the outer-most surface of the Lüneburg lens. According to a couple additional embodiments of an optical communication system, the Lüneburg lens may have an external surface shape that is either spherical or hemispherical.

An embodiment of a communication platform is disclosed. The embodiment of a communication platform may include at least one optical communication system. Each embodiment of the at least one optical communication system may further include an optical receiver configured to receive inbound optical signals. The optical receiver may further include a Lüneburg lens. Each embodiment of the at least one optical communication system may further include a processor in communication with the optical receiver. The processor may further be configured for calculating power gradient of energy density of the inbound optical signals. The processor may further be configured for isolating discrete inbound optical signals. The processor may further be configured for determining direction of the inbound optical light signals. The processor may further be configured for gathering information transmitted in the inbound optical light signals or decoding.

According to one embodiment of a communication platform, the at least one optical communication system may further include an optical transmitter in communication with the processor and configured to transmit outbound optical signals under processor control. According to another embodiment of a communication platform, the optical receiver may further include a photodetector having a sensor plane. According to this particular embodiment, the photodetector may be adjacent to the Lüneburg lens and configured to receive the inbound optical light signals transmitted through the Lüneburg lens. According to this particular embodiment, the photodetector may further be configured to detect optical signal energy density corresponding to x-y locations along the sensor plane. According to a couple additional embodiments of the optical communication platform, the Lüneburg lens may have an external surface shape of either spherical or hemispherical.

According to another embodiment of a communication platform, the Lüneburg lens may be formed of a continuous refractive medium. According to yet another embodiment of a communication platform, the refractive medium may be a gradient index lens having a refractive index that decreases radially from a center-most surface to the outer-most surface of the Lüneburg lens. According to still yet another embodiment, the communication platform may be an aerial vehicle. According to one embodiment, the communication platform may further include a ground mounted tower, wherein the at least one communication system is coupled to an upper section of the tower.

According to an illustrative embodiment of the present disclosure, a communication system comprises a transmission section surrounding an antenna section. The transmission section can be made of concentric layers of lens elements, mirror elements, or refraction medium. The layers allow incoming electromagnetic radiation (EMR) to be directed to the antenna section through reflection or refraction. The antenna section can be made of a plurality of antenna elements such that each antenna element detects incoming EMR signals from different angles of origin even when the signals are received simultaneously. Signal information can then be sent to other devices through input/output (I/O) lines coupled to the antenna section.

According to a further illustrative embodiment of the present disclosure, an antenna section can be created with a variable number and size of individual antenna elements. Exemplary embodiments can include a larger number of antenna elements to increase accuracy of signal detection and direction finding. Antenna elements can be made in a variety of sizes to improve accuracy or manufacturing simplicity.

According to a further illustrative embodiment of the present disclosure, communication systems can be mounted onto a stationary or mobile platform. A plurality of communication systems can be used to provide detection coverage of specific angles and can include overlapping coverage. Coverage is not needed for angles where signal detection is not wanted or expected.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed.

From the above description of the embodiments of the communications receiver 100, communications systems 1 and 200 and method 800 for manufacturing communication systems, it is manifest that various alternative structures may be used for implementing features of the present invention without departing from the scope of the claims. The described embodiments are to be considered in all respects as illustrative and not restrictive. It will further be understood that the present invention may suitably comprise, consist of, or consist essentially of the component parts, method steps and limitations disclosed herein. The method and/or apparatus disclosed herein may be practiced in the absence of any element that is not specifically claimed and/or disclosed herein.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. An optical communication receiver, comprising:
   a photodetector having a sensor plane, the photodetector configured to receive incident optical light signals and detect optical signal energy density corresponding to x-y locations along the sensor plane;
   a Lüneburg lens adjacent to the photodetector and configured to direct incident optical light signals onto the sensor plane of the photodetector; and
   a processor in communication with the photodetector configured for calculating power gradient of the optical signal energy density, isolating discrete signals, determining direction of the incident optical light signals and gathering information transmitted in the incident optical light signals.

2. The optical communications receiver according to claim 1, wherein the Lüneburg lens comprises an external surface shape selected from the group consisting of: spherical and hemispherical.

3. The optical communications receiver according to claim 1, wherein the Lüneburg lens is tuned for visible spectrum light transmission.

4. The optical communications receiver according to claim 1, wherein the Lüneburg lens comprises a continuous refractive medium.

5. The optical communications receiver according to claim 4, the refractive medium comprises a gradient index lens having a refractive index that decreases radially from a center-most surface to the outer-most surface of the Lüneburg lens.

6. An optical communication system comprising:
   an optical receiver configured to receive inbound optical signals, the optical receiver comprising a Lüneburg lens; and
   a processor in communication with the optical receiver and configured for calculating power gradient of energy density of the inbound optical signals, isolating discrete inbound optical signals, determining direction of the inbound optical light signals and gathering information transmitted in the inbound optical light signals.

7. The optical communication system according to claim 6, further comprising an optical transmitter in communication with the processor and configured to transmit outbound optical signals under processor control.

8. The optical communication system according to claim 6, wherein the optical receiver further comprises a photodetector having a sensor plane, the photodetector adjacent to the Lüneburg lens and configured to receive the inbound optical light signals transmitted through the Lüneburg lens and detect optical signal energy density corresponding to x-y locations along the sensor plane.

9. The optical communications system according to claim 6, wherein the Lüneburg lens is tuned for visible spectrum light transmission.

10. The optical communication system according to claim 6, wherein the Lüneburg lens comprises a continuous refractive medium.

11. The optical communication system according to claim 10, wherein the refractive medium comprises a gradient index lens having a refractive index that decreases radially from a center-most surface to the outer-most surface of the Lüneburg lens.

12. The optical communications system according to claim 6, wherein the Lüneburg lens comprises an external surface shape selected from the group consisting of: spherical and hemispherical.

13. A communication platform, comprising:
   at least one optical communication system, comprising:
      an optical receiver configured to receive inbound optical signals, the optical receiver comprising a Lüneburg lens; and
      a processor in communication with the optical receiver and configured for calculating power gradient of energy density of the inbound optical signals, isolating discrete inbound optical signals, determining direction of the inbound optical light signals and gathering information transmitted in the inbound optical light signals.

14. The communication platform according to claim 13, wherein the at least one optical communication system further comprises an optical transmitter in communication with the processor and configured to transmit outbound optical signals under processor control.

15. The communication platform according to claim 13, wherein the optical receiver further comprises a photodetector having a sensor plane, the photodetector adjacent to the Lüneburg lens and configured to receive the inbound optical light signals transmitted through the Lüneburg lens and detect optical signal energy density corresponding to x-y locations along the sensor plane.

16. The communication platform according to claim 13, wherein the Lüneburg lens comprises an external surface shape selected from the group consisting of: spherical and hemispherical.

17. The communication platform according to claim 13, wherein the Lüneburg lens comprises a continuous refractive medium.

18. The communication platform according to claim 17, wherein the refractive medium comprises a gradient index lens having a refractive index that decreases radially from a center-most surface to the outer-most surface of the Lüneburg lens.

19. The communication platform of claim 13, further comprising an aerial vehicle.

20. The communication platform of claim 13, further comprising a ground mounted tower, wherein the at least one communication system is coupled to an upper section of the tower.

* * * * *